Feb. 9, 1943.                R. E. HART                 2,310,431
                              TRAILER
                       Filed July 20, 1940          2 Sheets-Sheet 1
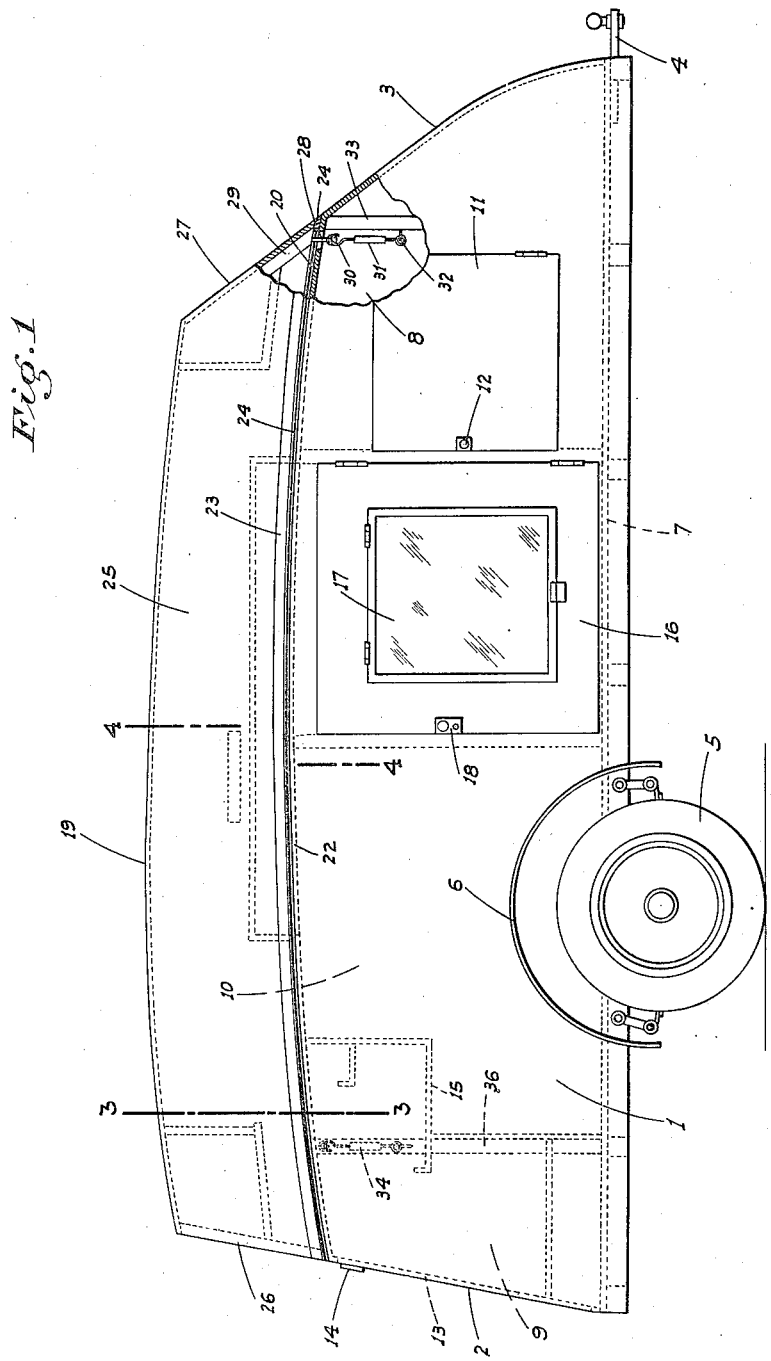
INVENTOR
Roy E. Hart
BY Feb. 9, 1943.   R. E. HART   2,310,431
TRAILER
Filed July 20, 1940   2 Sheets-Sheet 2
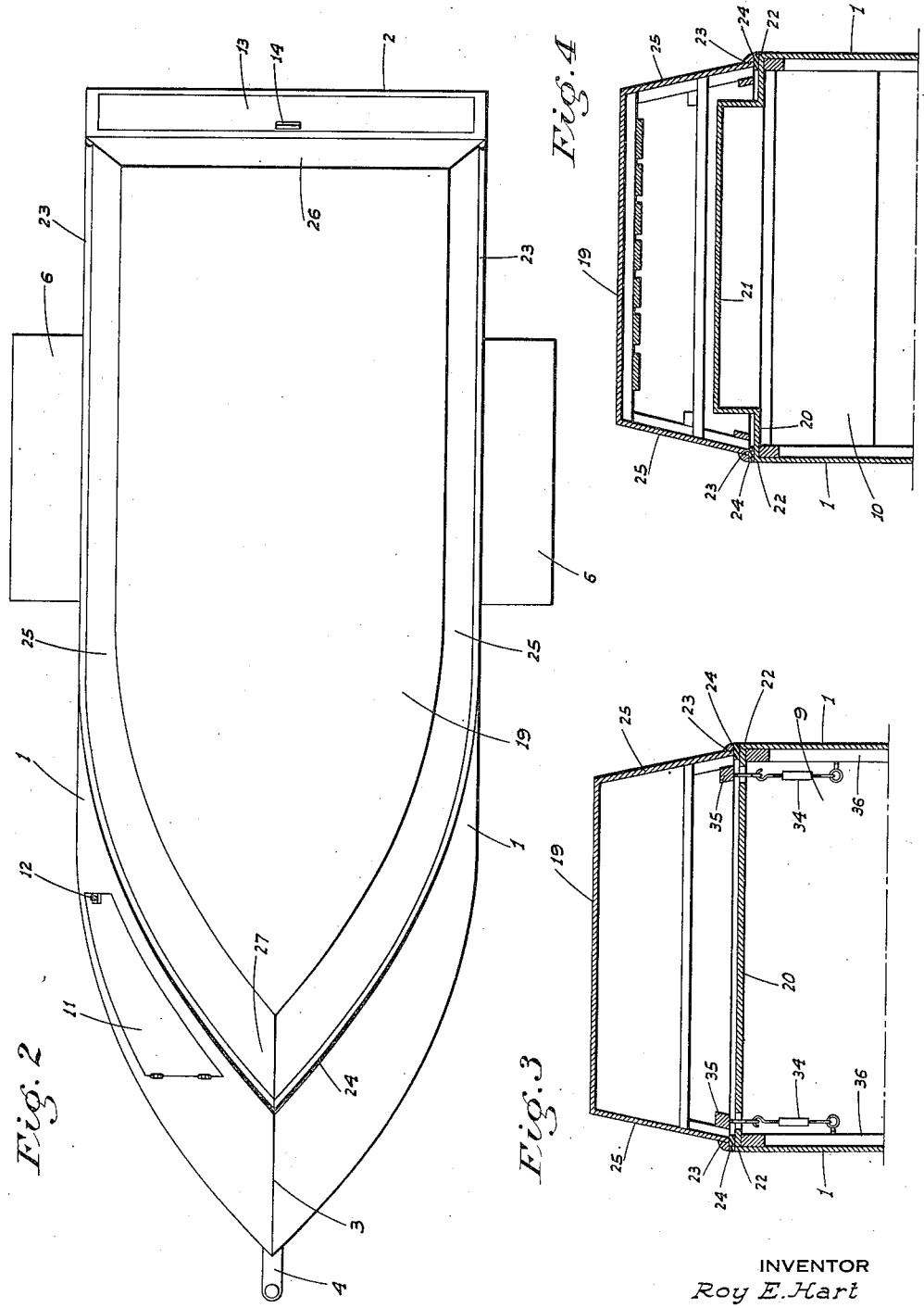
INVENTOR
Roy E. Hart Patented Feb. 9, 1943

2,310,431

UNITED STATES PATENT OFFICE 2,310,431

TRAILER

Roy E. Hart, Stockton, Calif.

Application July 20, 1940, Serial No. 346,594

1 Claim. (Cl. 296—23)

This invention relates in general to an improvement in camp trailers, and in particular the invention is directed to, and it is my principal object to provide, a camp trailer constructed with a portion thereof as a boat; such boat being removable from the remainder of the trailer for use.

Another object of the invention is to provide a trailer, as above, wherein the boat portion thereof is inverted and forms a protective roof for the trailer when said boat is secured in carrying position.

It is also an object of the invention to provide novel means to secure the boat on the remainder of the trailer; such means being releasable only from within the body of the trailer, so that only persons having access into said body may release said means and remove the boat.

An additional object of the invention is to provide a trailer including a boat removably mounted in assembly therewith; the boat being carried in inverted position atop the remainder of the trailer, and the portion of the trailer upon which the slightly curved gunwales of the boat rest being formed symmetrical therewith whereby to facilitate initial location of the boat in place and to prevent any tendency to relative longitudinal shifting thereof—after being secured in place.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:

Figure 1 is a side elevation of the trailer with the boat portion thereof in carrying position.

Figure 2 is a top plan of the trailer and boat portion as assembled.

Figure 3 is a fragmentary transverse section on line 3—3 of Fig. 1.

Fig. 4 is a fragmentary transverse section on line 4—4 of Fig. 1.

Referring now more particularly to the characters of reference on the drawings, the improved trailer is preferably of the relatively small camp type—as distinguished from a house trailer—and comprises a body including side panels 1 and a back panel 2 rigidly supported by a suitably formed frame. The side panels 1 converge adjacent their forward ends and said ends are secured together forming a leading edge 3 which slopes upwardly and rearwardly as shown.

A rigid tongue and coupling unit 4 projects forwardly from the front end of the trailer frame, while the trailer is supported adjacent its rear end by a pair of wheels 5 mounted with the trailer in the usual manner. Fenders 6 are mounted on sides 1 and shield the wheels.

The interior of the trailer is floored, as indicated at 7, and is separated by suitable vertical partitions into a forward storage compartment 8, a rear storage compartment 9, and an intermediate sleeping compartment or berth 10. Access to compartment 8 is provided by a hinged side door 11 fitted with a lock 12, while a rear door 13 likewise fitted with a lock 14 affords access into the rear compartment 9, such rear compartment having storage shelves 15 built thereinto. A hinged side door 16, fitted with a window 17 and lock 18, opens into the berth 10; such door 16 being of substantial height and width to permit a person to enter therethrough.

The boat portion of the trailer is indicated generally at 19, and is of light construction following relatively closely the configuration of the usual flat-bottom row boat. This boat portion, when in carrying position, is inverted and rests atop the body of the trailer forming, in effect, a protective roof. The body is itself roofed, as at 20; such roof including an upward extension 21 which adds head room in berth 10, the extension being of a size to project into the inverted boat portion. However, as the boat portion, when in carrying position, forms a protective roof, as well as insulating the body roof, such body roof 20 and including extension 21 can be of light weight material.

The outer and upper edges 22 of the body are formed somewhat convex, so that when the boat portion 19 is inverted and placed in carrying position atop said body, the concavely curved gunwales 23 of the boat portion symmetrically and closely engage the corresponding edges of the body, preventing any tendency to relative longitudinal shifting of said boat portion; there being cushion strips 24 of sponge rubber or the like interposed in protective and sealing relation between edges 22 and gunwales 23. Further, the body and the boat portion are formed so that when in assembly, the side panels 1 and back panel 2 are substantially flush with the sides 25 and stern 26 respectively of the boat portion; the stem 27 of the boat portion extending as a continuation of body edge 3.

The boat portion 19 is releasably secured with the body in the following manner. An eye bolt 28 is fixed with the stem piece 29 of the boat and the eye projects through an opening in the body roof 20 into forward compartment 8; such eye being engaged by a hook 30 on one end of a turnbuckle 31 anchored therebelow and at its other end with another eye bolt 32 mounted on a body stud 33. A pair of transversely spaced eye bolt and turnbuckle units 34, of the same type as above, are connected between the longitudinal inner cleats 35 of the boat portion adjacent the stern thereof, and side studs 36 of the trailer body; such units extending through openings in roof 20 and being accessible only from within rear compartment 9. As the eye bolt and turnbuckle units are only accessible from within normally locked compartments of the trailer, the boat portion cannot be removed by persons without authority.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

In the combination of a vehicle which includes a body having a top, a boat disposed in inverted position atop the body and symmetrically engaging the latter about the entire normally upper edge of said boat whereby to prevent access to the interior of the boat when the latter is so disposed, and means releasably connecting the boat and the body; non-communicating compartments in opposite ends of the body, said compartments having normally locked access doors opening thereinto, said last-named means comprising connector units releasably connected between the interior of the boat and the body at points within said compartments, the top having openings through which said units depend, and said units being releasable only from within said compartments and below said top.

ROY E. HART.